Oct. 10, 1961  R. A. PALMORE  3,003,582
AIR FILTERING APPARATUS
Filed Nov. 27, 1959  2 Sheets-Sheet 1
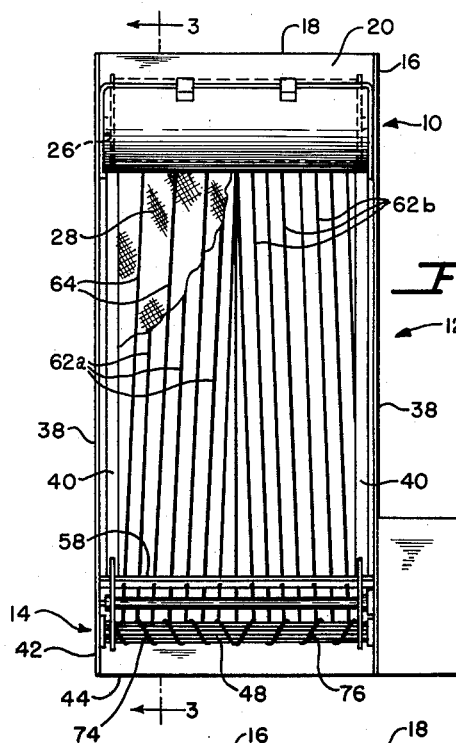
FIG. 1
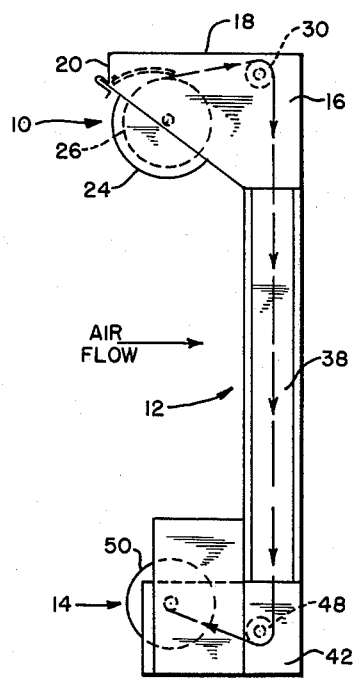
FIG. 2
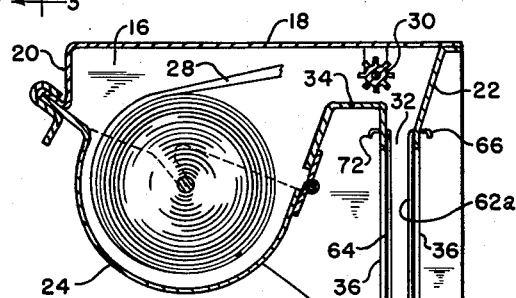
FIG. 3
INVENTOR.
ROBERT A. PALMORE
BY
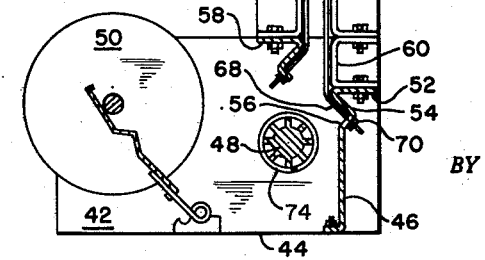
ATTORNEY

INVENTOR.
ROBERT A. PALMORE

United States Patent Office 3,003,582
Patented Oct. 10, 1961

3,003,582
AIR FILTERING APPARATUS
Robert A. Palmore, Louisville, Ky., assignor to American Air Filter Company, Inc., Louisville, Ky., a corporation of Delaware
Filed Nov. 27, 1959, Ser. No. 855,739
7 Claims. (Cl. 183—62)

This invention relates to air filters of the disposable medium type wherein a web of expansible-compressible permeable material or medium is advanced from a supply zone, through an air filtering zone in a resiliently expanded condition, and to a discharge zone where the used web is conditioned for disposal.

One air filter apparatus of this general character wherein the web is maintained in a compressed condition in the supply zone and is recompressed in the discharge zone after being passed through the air filtering zone in a resiliently expanded condition, is broadly disclosed in Rivers U.S. Patent 2,807,330 granted September 24, 1957. My co-pending U.S. patent application Serial No. 699,375 discloses apparatus having certain improvements and modifications in structure for a filter of this same character. Most commercial filter apparatus of this general type include a supply zone containing a supply spool having an expansible-compressible filamentous fiber glass web convolutely wound thereon in a compressed condition, an air filtering zone through which the web passes in an operatively expanded condition, and a discharge zone containing a rewind spool which is rotated to apply tension to the web and thereby effect a desired advance thereof through the air filter zone; the rewind spool also serving to receive and recompress the used medium so as to form a compact, readily disposable package thereof.

The filamentous fiber glass web commonly used in such apparatus, and other expansible-compressible webs having similar characteristics, are subject to being narrowed in width or to being "necked" when the web is pulled in a lengthwise direction such as occurs when the rewind roll is rotated to displace air filter medium in the air filtering zone. If the medium is narrowed or necked below a certain width in the air filtering zone, the edges of the medium will be pulled inwardly away from the filter medium edge sealing means so that the air to be cleaned can pass between the medium edge and the seal without being subjected to a filtering action.

One object of the present invention is an improved construction for air filter apparatus in which the filter medium guiding and supporting structure is arranged to resist the tendency of the air filter medium to narrow or neck as it is being advanced in its passage to a rewind spool.

Another object is the provision of such guide and support means arranged to provide increasing resistance to the increasing tendency of the medium to narrow in particular areas.

Briefly, in accordance with my invention, it is recognized that webs such as are commonly used in the described air filter apparatus are of a requisite resilient nature that guiding elements may be arranged to bear against one or both yieldable faces of the medium to provide a particular directional guidance to the medium as it is advanced. Thus, in one specific embodiment in which the filter medium is arranged to be advanced in a substantially vertical direction from an upper supply spool through an air filtering zone to a lower discharge spool, the downstream support elements or rod on both sides of the vertical center line of the filter, and against which the downstream face of the medium bears when in the air filtering zone, are arranged to diverge from the vertical center line of the filter towards the sides of the filter in the direction of the medium advance. Thus the medium, when advanced, is subjected to a guiding force tending to maintain the vertical side edges of the medium in the vertical side seals of the filter apparatus. Additionally, upstream support rods disposed in a plane adjacent the upstream face of the medium may be similarly arranged to provide a pattern of descendingly diverging elements, and in a preferred arrangement are further arranged in a plane which converges in the direction of medium advance with the plane of the downstream support structure. Further, the element in the discharge zone which serves as a bearing or turning surface around which used filter medium passes to the rewind spool is provided with oppositely directed helical elements on each half of the length of the element so that the tendency of the used medium to narrow as it passes therearound is resisted and so that any relative motion resulting from the medium slipping on the surface element provides a widening force on the medium.

The principles of the invention are applicable, in part at least, to air filter apparatus of the type in which the filter medium is advanced through an air filtering zone occupying a substantially vertical plane between horizontally spaced supply and discharge zones; in this case the guide and support elements being included upwardly in the direction of medium advance to resist any sagging tendency of the medium.

The invention is illustrated in the accompanying drawing which discloses, by way of example, the principles of the invention and the presently preferred embodiments incorporating those principles, and wherein:

FIGURE 1 is a front elevational view of an air filter of the character mentioned and in which most of the air filter medium and certain other parts are deleted to better illustrate the appearance of portions of the filter medium guide and support arrangement;

FIGURE 2 is a side elevational view of the apparatus of FIGURE 1 with the path of filter medium advance from the supply zone through the air flow zone to the discharge zone indicated;

FIGURE 3 is a broken, vertical sectional view taken along the line 3—3 of FIGURE 1;

Figure 4:
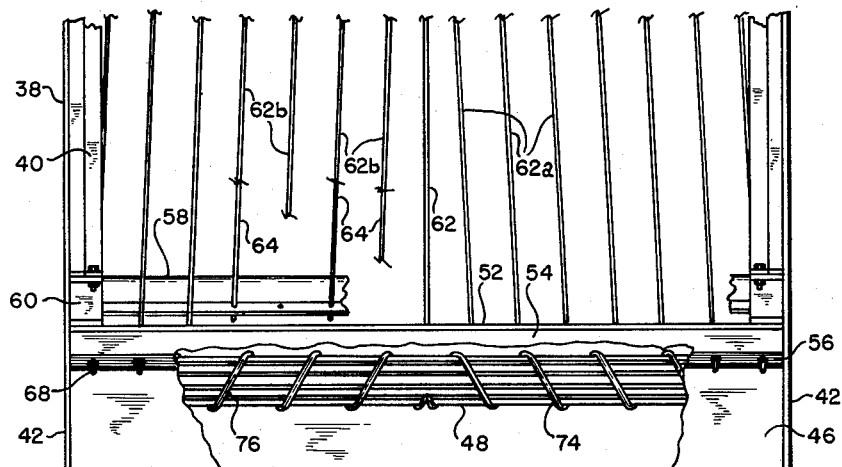
FIGURE 4 is a fragmentary, partly broken, rear elevational view of the lower portion of the apparatus.

Referring to the drawing, the numeral 10 generally indicates the filter medium supply zone, the numeral 12 generally indicates the air flow zone through which the filter medium is advanced in its operatively expanded condition, and the numeral 14 generally designates the discharge zone into which the used medium is fed or advanced for conditioning into a relatively compact package permitting convenient disposal thereof. Air flow through the apparatus in a front to rear direction is indicated by the arrow.

The supply zone 10 is formed by a pair of generally triangularly shaped side wall portions 16, a top wall 18, a front wall 20, a rear wall 22 and, a semi-cylindrical or trough-like front cover 24 pivotally supported along its lower rear edge by the side walls and adapted to receive the filter medium supply spool 26 which is carried therewithin in nesting relationship. The spool 26 has a supply of filter medium 28 of the character mentioned convolutely wound thereupon, the spool being disposed within the cover so that when the filter medium is advanced it passes from the upper side of the spool over a fluted idler roller 30 which extends transversely across the supply zone and is spaced slightly below the top wall 18. The ends of the roller are rotatably mounted on the side walls 16 so that the roller may rotate as the filter medium is advanced, and thus serve, in cooperation with control apparatus disclosed in co-pending Hyatt U.S. patent application Serial No. 706,490 to meter the medium advance in an automatic method of operation. It will be understood that the present invention is applicable to an air filter of the disposable medium type whether it is automatically controlled or whether the medium is advanced manually; in the latter case the idler roller 30 serving primarily as a bearing surface around which the medium is directed in its passage into the air flow zone.

After the medium passes around the idler roll 30 it is advanced into the air flow zone through a generally rectangular entrance aperture 32 defined at the rear by the downwardly directed lower edge of the rear wall 22 and at the front by a downwardly directed rear flange of a cross plate 34 extending between and secured at its ends to the side walls 16 of the supply zone. The sides of the entrance aperture 32 are defined by the inner surfaces of the side walls 16. The side walls 16 have a pair of inwardly directed, vertically disposed flange elements 36, spaced apart in a front to rear direction, to form the channel-like edge seals for the vertical edges of the filter medium after it has entered the air flow zone.

The air flow zone is framed along most of its height by vertical frame members 38 secured at their upper ends to the lower ends of the supply zone side walls 16, and at their lower ends to the discharge zone structure. The inner face of each frame member carries inwardly directed, vertically extending, flange elements 40 spaced apart in a front to rear direction to form channel-like edge seals for the filter medium. As will be apparent, these edge seals are aligned with the edge seal flanges 36 mounted on the supply zone side walls 16, and simply form a continuation of the inwardly directed edge sealing channels through the air flow zone.

The discharge zone 14 structure includes a pair of rectangular side walls 42, a bottom wall 44, a rear wall 46, a transversely disposed roller-like element or reel 48 supported at its ends from the side walls 42 and spaced slightly forward of the rear wall 46, and a filter medium rewind spool 50 which also has its ends mounted on the side walls 42. The rewind spool may be driven by automatically controlled motor means or may be arranged to be manually rotated.

The filter medium exits from the air flow zone around the rear and bottom surfaces of the reel 48 and thence forwardly to the core of the rewind spool 50 where it is normally wound in a compressed condition. The reel 48 is spaced forwardly from the rear wall 46 a distance which causes the medium passed therebetween to be compressed slightly at least. The reel 48 has its ends mounted in bushings to permit rotation of the reel as the medium engages the periphery of the reel, it being noted that there is normally experienced some slippage or relative motion between the medium and reel periphery.

The upper margin of the discharge zone rear wall 46 includes a horizontally disposed, rearwardly directed top flange 52, a rearwardly and downwardly sloping bight or central portion 54, and a forwardly and downwardly sloping connecting portion 56. A cross member 58 spaced forwardly and upwardly from the rear wall upper portion is similarly Z-shaped in cross section, but is reversely disposed. These generally Z-shaped elements serve to receive and secure the bottom ends of the upstream and downstream medium support and guide rods to be described. Stub flanges 60 disposed between the lower end of the side seal rear flange 40 and the top 52 of the rear wall provide a continuation of the rear side seals to the exiting point of the filter medium from the air flow zone.

The filter medium guide and support means extending through the air flow zone includes: rear elements or rods 62 secured at their upper ends in the supply zone and at their lower ends in the discharge zone and serving to support the medium against downstream displacement and in certain other respects to be detailed hereinafter; and front elements or rods 64 likewise secured at both ends and serving to prevent upstream displacement from back drafts and the like and additionally in other respects also to be hereinafter detailed.

The rear rods 62 include hook-like upper ends 66 adapted to be secured to the lower edge portion of the supply zone rear wall 22 by inserting the hook portions through laterally spaced holes in this lower edge portion. The lower ends 68 of the rear rods are bent or pre-formed to permit the bent portion to parallel and underlie the bight portion 54 of the discharge zone rear wall 46. These rear rods are sized so that the threaded extremities of successive rear rods will project through successive laterally spaced holes in the connecting portion 56 of the rear wall and thus can be secured by suitable nuts 70 applied to the threaded ends.

The front rods 64 are similarly fabricated to permit the upper hook ends 72 thereof to be secured in laterally spaced holes in the rear flange of cross plate 34, and the lower ends of the rods to be secured to the Z-shaped lower front cross member 58 in a manner similar to the lower ends of the rear rods.

In accordance with one feature of the invention, each rear rod disposed on the left side of the vertical center line of the filter apparatus (such left rear rods being designed 62a) has its lower end 68 secured in a connecting portion 56 hole which is offset to the left of the hole in which the upper hook end 66 is secured, while each rear rod disposed on the right side of the vertical center line of the filter apparatus (such right rear rods being designated 62b) has its lower end 68 secured in a connecting portion 56 hole which is offset to the right of the hole in which the upper hook end is secured. A central rear rod 62 is preferably secured at its top and bottom ends in the upper and lower central holes so that it is aligned with the vertical center line of the filter apparatus. The rear rod 62a located immediately to the left of the central rear rod 62 has its upper end secured in the same upper central hole, but its lower end secured in a hole in cross member 58 offset to the left from the central hole therein. Likewise, the rear rod 62b located immediately to the right of the central rear rod 62 has its upper end secured in the same upper central hole, but its lower end secured in a hole in cross member 58 offset to the right from the central hole therein. Each succeeding rear rod to the left and the right is disposed in parallel relation to the first left and first right rods respectively to form the diverging rear rod pattern illustrated in FIGURE 1. While it is currently preferred from an ease of manufacturing standpoint that the holes in both the upper and lower rear rod mounting members be equally spaced at about 3″ to 4″, it is noted that the arrangement can be modified to present a pattern of a number of vertical, parallel rods in the central area, and rods diverging from a center line be provided in the outer or edge area portions only.

It will be appreciated that with the diverging arrangement of rear rods as illustrated and explained, the filter medium when stationary is supported against downstream displacement forces exerted by air flow by the rear rods, and when the medium is advanced the engagement of the downwardly diverging rods with the resilient and yieldable downstream face of the medium tends to impart an outwardly directed component of force to the medium along those lines where the rods are disposed and thus resists necking of the medium.

The number of front rods 64 provided is usually less than the number of rear rods 62. It is preferable that the front rods also be disposed with at least the outer left and right hand rods diverging from a vertical center line and from each other in a top to bottom direction.

In accordance with another feature of the invention, the plane in which the rear rods 62 lie, and the plane in which the front rods 64 lie, may advantageously be arranged to gradually converge relative to each other in the direction of medium advance, i.e., from top to bottom. This is expeditiously accomplished by mounting the cross members to which the ends of the front and rear rods are secured so as to provide a smaller space between the planar group of front rods and the planar group of rear rods adjacent the discharge zone than at the entrance aperture 32 to the air flow zone. As one example of such spacing, when nominally 2″ thick filter medium of the filamentous fiber glass type is contemplated for use, the spacing of the planar groups of rods may be 2″ at the top and 1¼″ to 1¾″ at the bottom. With such an arrangement, the increasing tendency of the advancing filter medium to neck at locations successively closer to the bottom of the filter apparatus is offset by the increasing divergent forces exerted on the medium resulting from the increased "bite" or engagement of the medium by the more closely spaced front and rear rods. Such a gradual convergence of upstream and downstream rods also serves to minimize sagging of the medium in the air flow zone.

The reel 48 in the discharge zone is provided with axially extending peripheral flutes or projections. The reel also has a right hand helical element 74 on the periphery of the left half of the reel, and a left hand helical element 76 on the periphery of the right half of the reel, both helical elements considered as viewed from the right side of FIGURE 1. These helical elements may be made from a suitable rod wrapped around the periphery of the reel and suitably secured thereto by welding or the like. Viewed from the rear, as in FIGURE 4, it may be seen that the segments of the helices against which the filter medium engages as it passes down and thence forwardly around the reel to the rewind spool present a diverging pattern in the direction of medium advance. Thus, since the rotation of the reel is effected solely by the advance of the medium which engages the reel, and some slippage or relative motion between the medium and reel normally occurs, this slippage is utilized to provide an outwardly directed component of force on the medium contacting each half of the reel. While it is preferred that the reel be rotatably mounted at its ends, it is noted that a stationary turning surface with only segments of helices can be utilized so long as the drag or frictional resistance occasioned thereby does not exceed practical limits.

Figure 5:
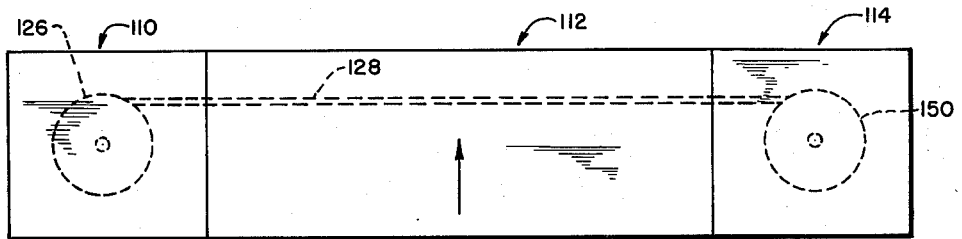
FIGURE 5 is a plan view of a horizontally disposed filter apparatus which is shown in elevation in FIGURE 6.
Figure 6:
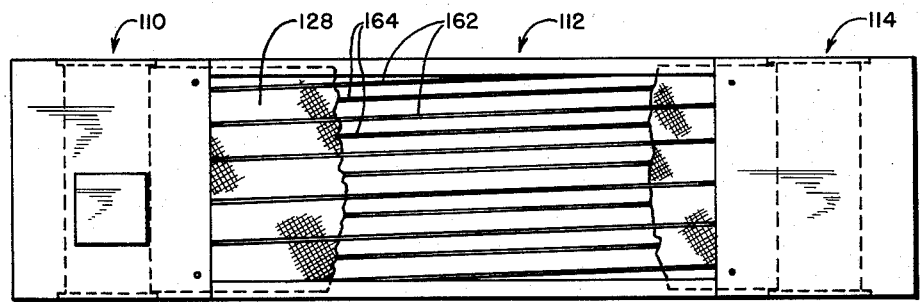
FIGURE 6 is a front elevational view of the apparatus of FIGURE 5 including filter medium guide and support structure particularly adapting the apparatus for service wherein the filter medium is advanced in a vertical plane between horizontally spaced supply and discharge zones.

When filter apparatus adapted to use filter medium of the character mentioned is horizontally disposed so that the medium is advanced in a vertical plane between horizontally spaced supply and discharge zones, apparatus of the type illustrated in FIGURES 5 and 6 is utilized. In this embodiment, the supply spool 126 is mounted in a vertical position in the supply zone designated 110 so that the filter medium 128 is advanced in a vertical plane and horizontally across the air flow zone 112 to a rewind spool 150 in the discharge zone 114. The problem of necking of the filter medium is, in large part at least, replaced by the problem of the upper portion of the medium sagging in such an apparatus. The principles of the present invention are applicable in the solution of this problem by arranging the filter medium guide and support structure in the air flow zone 112 to impart an upwardly directed force to the filter medium as it is advanced across this air flow zone. This is accomplished as illustrated in FIGURE 6 wherein at least the rear rods 162, and preferably the front rods 164 also, slant upwardly in the direction of medium advance. As will be appreciated from the previous comments in connection with the upright or vertically disposed filter apparatus, the determination of the number and degree of inclination of the rods 162 and 164, and the desirability of arranging the front and rear rods in planar groups which converge in the direction of medium advance, are dependent upon the degree of sagging or necking anticipated with filter medium of a given character and the size of the filter apparatus.

The invention claimed is:

1. In air filter apparatus arranged to employ, as a filter medium, a web of expansible-compressible permeable material and in which the filter medium is advanced from a supply zone, through an air filtering zone in a planar curtain form and a resiliently expanded state, and into a discharge zone, filter medium guide and support structure comprising: a substantially planar group of rods disposed to engage and support a surface of said filter medium in said planar curtain form in said air filtering zone, said group including a plurality of rods having a length generally coextensive with the length of said air filtering zone and disposed, throughout said length, at an angle relative to the direction of filter medium advance for urging said filter medium engaged by said angularly disposed rods in a filter medium width increasing direction.

2. In air filter apparatus arranged to employ, as a filter medium, a web of expansible-compressible permeable material that will resiliently expand upon removal of compression forces thereon and in which the filter medium is advanced from a compressed state in a supply zone through an air filtering zone in a planar curtain form and a substantially vertical direction and into a discharge zone containing means for rolling the used filter medium into a disposable state, guiding and supporting structure for said filter medium comprising: downstream and upstream planar groups of laterally-spaced, generally longitudinally-directed rods disposed to engage the respective downstream and upstream faces of said filter medium in said planar curtain form in said air filtering zone, each of said planar groups including angularly disposed rods having a length generally coextensive with the length of said air filtering zone and arranged with said rods on both sides of a longitudinal centerline diverging throughout their length relative to said centerline in the direction of filter medium travel.

3. In air filter apparatus arranged to employ, as a filter medium, a web of expansible-compressible permeable material which is adapted to be advanced from a supply zone, through an air filtering zone in an expanded state, and into a discharge zone by means of tension applied to said filter medium in said discharge zone, filter medium guide and support structure comprising: means including generally longitudinally-disposed, laterally-spaced, rod-like elements engaging a surface of said expanded filter medium throughout substantially the length of said air flow zone, at least a portion of said elements diverging laterally from a longitudinal centerline in the direction of filter medium advance; and a laterally-exanding filter medium turning member mounted in said discharge zone, said member including means forming, on its surface adapted to be engaged by said filter medium, a plurality of laterally-spaced, outwardly-directed arcuate segments on each half of said member as divided by said filter apparatus centerline.

4. In air filter apparatus arranged to employ, as a filter medium, a web of expansible-compressible permeable material that will resiliently expand upon removal of compressive forces thereon and in which the filter medium is advanced in a planar curtain form and in a substantially expanded state and in a generally vertical direction through an air filtering zone, guide and support structure for said filter medium comprising: a planar group of rods disposed to engage and support the downstream surface of said filter medium in said planar curtain form in said air filtering zone, said group including rods of a length generally coextensive with the length of said air filtering zone on both sides of the vertical center line of said air filtering zone disposed to diverge throughout their length from said centerline in the direction of filter medium advance whereby narrowing of said filter medium when advanced is resisted.

5. In air filter apparatus arranged to employ, as a filter medium, a web of expansible-compressible permeable material that will resiliently expand upon removal of compressive forces thereon and in which the filter medium is advanced in a planar curtain form and in a substantially expanded state and in a generally vertical direction through an air filtering zone, guide and support structure for said filter medium comprising: a planar group of rods disposed to engage and support the downstream surface of said filter medium in said planar curtain form in said air filtering zone, said group including rods of a length generally coextensive with the length of said air filtering zone on both sides of the vertical center line of said air filtering zone disposed to diverge throughout their length from said center line in the direction of filter medium advance; and, a second planar group of laterally-spaced rods disposed to extend generally longitudinally in engaging relationship with the upstream face of said filter medium in said air filtering zone, said second planar group being spaced upstream from said first planar group a distance less than the normally expanded operative air flow depth of said filter medium.

6. In air filter apparatus as specified in claim 5: said second group includes rods on both sides of the vertical center line of said air filtering zone disposed to diverge from said center line in the direction of filter medium advance.

7. In air filter apparatus as specified in claim 5: said first planar group is disposed in a plane lying in converging relationship in the direction of filter medium travel with the plane in which said second planar group is disposed to afford progressively increasing engagement of said planar groups with said filter medium in the direction of filter medium travel, whereby the forces resisting narrowing of said filter medium when advanced progressively increase in the direction of filter medium travel.

References Cited in the file of this patent
UNITED STATES PATENTS

| | | |
|---|---|---|
| 1,797,248 | Szegvari et al. | Mar. 24, 1931 |
| 2,848,064 | Gregory et al. | Aug. 19, 1958 |
| 2,869,680 | Fields | Jan. 20, 1959 |
| 2,881,861 | Dyer | Apr. 14, 1959 |